(No Model.)
H. W. WILDMAN.
RIDING PLOW.
No. 396,793. Patented Jan. 29, 1889.
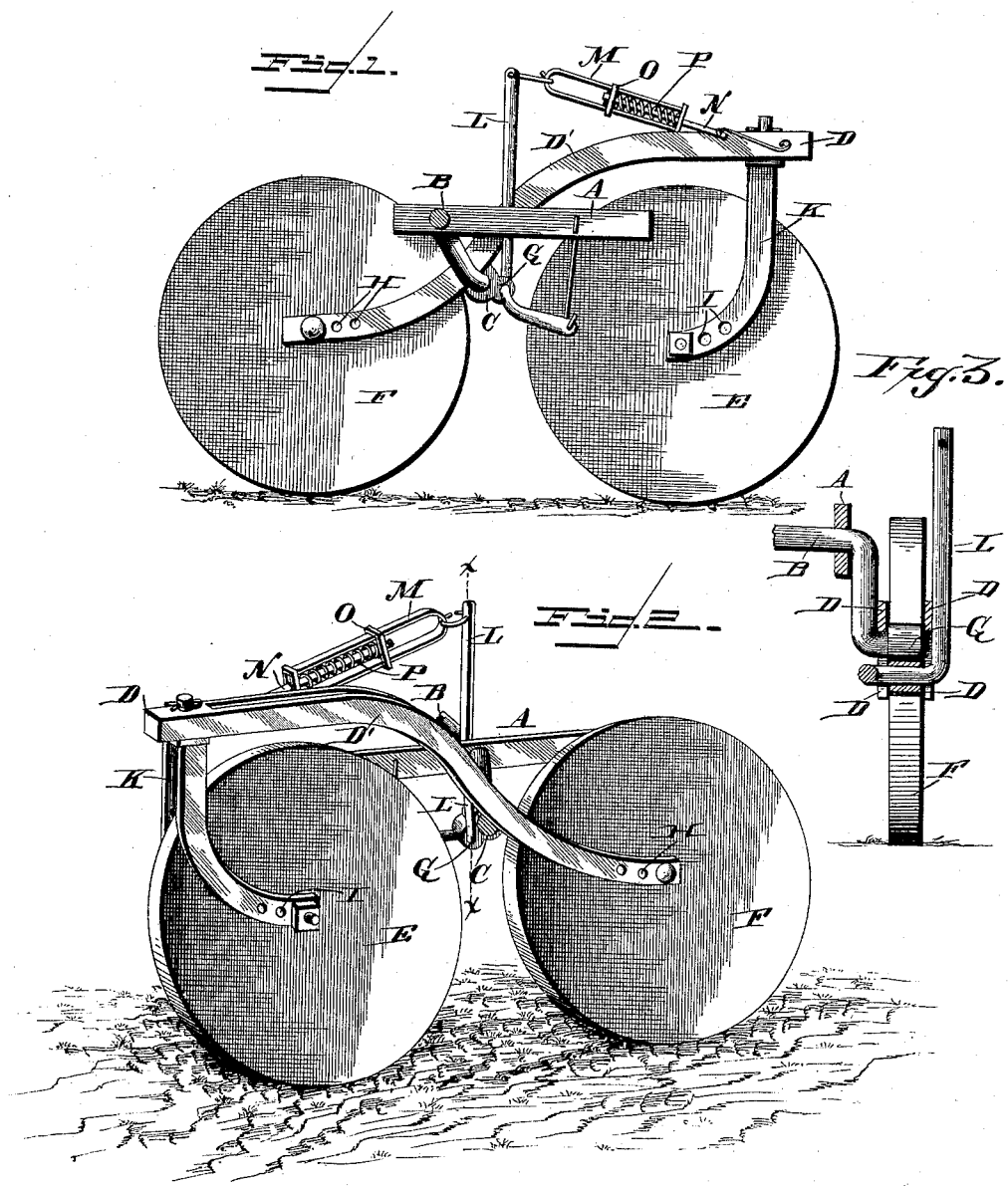
WITNESSES
INVENTOR
Henry William Wildman,
per John G. Manahan,
Attorney

UNITED STATES PATENT OFFICE.

HENRY WILLIAM WILDMAN, OF LEON, ILLINOIS.

RIDING-PLOW.

SPECIFICATION forming part of Letters Patent No. 396,793, dated January 29, 1889.

Application filed October 25, 1888. Serial No. 289,163. (No model.)

*To all whom it may concern:*

Be it known that I, HENRY WILLIAM WILDMAN, a citizen of the United States, residing at Leon, in the county of Whiteside and State of Illinois, have invented certain new and useful Improvements in Attachments for Riding-Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
My invention has reference to attachments for riding-plows; and it consists in certain improvements in the land-wheel intended to obviate the usual lateral oscillation of the plow occasioned by the passage of said wheel over uneven ground.

In plowing ground which had previously been planted to corn, farmers prefer to plow in a direction perpendicular to that in which the corn had been previously worked. The working of the corn leaves the ground formed in ridges and uneven hollows, the ridges being in the line of the corn-hills and the hollows being between said rows. To plow in the line of said hollows and ridges would make the furrows of unequal depth, and would reproduce on the plowed ground to a large degree the same series of ridges that previously existed on the surface of the land. Therefore, to attain a greater uniformity in the depth of the furrows and to destroy this ridged condition, the preference is for plowing across said ridges and hollows rather than in the line therewith. In the riding-plow the main objection to such cross-plowing is that the land-wheel is continually rising over ridges and dropping into uneven hollows, and thus constantly oscillating the plow laterally and to some extent raising and lowering it—a condition which largely interferes with the working of the plow and the quality of the work, and also continuously jolts the occupant of the plow and renders his position so uncomfortable that he frequently prefers to walk. The inconvenience above referred to exists, also, in a greater or less degree in the plowing of any rough ground, and my invention is proportionately advantageous in the plowing of any rough ground, although it is more especially adapted to cross-plowing corn-ground, as aforesaid.

In my invention I obviate the objection above named by supporting the spindle of the axle of the land-wheel between two vertical wheels arranged to follow each other in the line of movement, and so placed relatively that while one of said wheels will be in the hollow the other will be upon the adjacent ridge, and that they shall coincidently change from ridge to hollow, and vice versa, without appreciably affecting the altitude of said spindle.

As my attachment is intended to be applied to any of the well-known riding-plows, I do not deem it necessary to show or describe the latter any further than is essential to a clear understanding of the mode of attachment and operation of my improvement.

In the drawings, Figure 1 is an elevation of the inner side of my invention, showing a portion of the usual frame of a riding-plow and a portion of the usual crank-axle of the land-wheel. Fig. 2 is an oblique view from the outer side thereof. Fig. 3 is a sectional view on line *x x*, Fig. 2.

A is a portion of the usual frame of the ordinary riding-plow.

B is the usual crank-axle, journaled in any suitable way in or to said frame. The outer end of the axle B is formed into a spindle, C, upon which is usually seated the land-wheel for carrying the landside of the plow and by the axial partial rotations of said axle to be utilized in leveling the plow laterally.

The parts thus far described are those common to most if not all of the riding-plows in general use.

D is a wheel-frame consisting of two parallel bars, D′, extended parallel with the plow-beam or line of draft. Under the forward end of the frame D is placed the front caster-wheel, E, suitably pivoted in said frame. The rear end of the frame D is suitably supported upon a rear wheel, F. In the construction shown the wheels E and F are exhibited as being attached to the bars D' between the latter; but it is obvious that such attachment can be effected in various other modes. The frame D is also shown in somewhat of an S shape, the front end thereof rising over the wheel E to permit the latter to be turned laterally under said frame in changing the direction of the plow; but the spirit of my invention will not be departed from in any other suitable conformation of said frame.

About midway of the frame D, and between the wheels E and F, the spindle C of the axle B is suitably journaled transversely in said frame so as to be carried thereby, and at the same time permit the necessary vertical oscillation of the ends of said frame.

In my construction G is the box for the spindle C, and for convenience is seated between the bars D' and partially projected below the same, the spindle C being seated in that portion of the box G which projects below the bars D', and said spindle can be pivotally attached to the bars D' in any other suitable manner.

As my invention will have its greatest adaptation in the cross-plowing above referred to, it is preferable that the distance from the spindle C to the pivotal centers of the wheels E and F, respectively, shall be the same, and that the distance between the centers of said wheels shall equal one-half of the space between the center of one corn-row and the center of the next succeeding one, so that when one wheel shall be on the ridge the other will be in the hollow between the ridges, and that one wheel will be climbing one ridge while the other is descending the adjacent one. The ordinary distance from center to center of the corn-rows is forty-four inches, although with some planters it is forty-eight inches. To render adjustable the distance between the centers of the wheels E and F to adapt them to the varying distances between the corn-rows, I provide a series of holes, H, in the rear ends of the bars D' for the optional seating of the rear wheel, F, and like holes, I, in the dependent caster-arms K, which carry the front wheel, for such adjustable attachment to the latter.

As the attachment of the spindle C to the frame D is of a pivotal character, a very large obstacle coming in contact with the front of the wheel E might result in tilting the rear end of the frame D upward, and in extreme cases inverting said frame. To prevent this, I pivotally attach the bar L near its center to the axle B and attach the inner end of said bar in any suitable manner to the frame A. The outer end of the bar L is bent upward in a substantially vertical position, and a stirrup, M, attached to the upper end thereof and projected toward the front end of the frame D. A restraining-arm, N, is suitably attached at its front end to the forward end of the frame D and projected backward through the front end of the stirrup M between the sides thereof and parallel therewith and centrally attached to a sliding head, O, sleeved upon the side bars of said stirrup. A coiled spring, P, seated between the front end of the stirrup M and head O, holds the arm N adjustably within said stirrup. The connection of the frame A to the inner end of the bar L prevents the outer end of the latter from moving forward; but when the wheel E drops into a depression the front end of the frame D is permitted to fall correspondingly by the spring P, allowing the arm N to slide forward in the stirrup M, the spring P at the same time causing the descent of said wheel to be less abrupt or sudden. When the wheel E rises over an obstruction or ridge, the front end of the frame D is permitted to rise by the backward thrust of the arm N. Vertical oscillation of the frame D, caused by the necessary rising and dropping of the rear wheel, F, is also allowed through the same mechanism. The degree of oscillation permitted to the frame D and the prevention of its inversion aforesaid can be accomplished in other obvious modes—for instance, by stops or lugs formed in or on the spindle C, frame D, or box G. The seat of the bar L upon the axle B is made pivotal, so as to permit the necessary axial rotation of the latter required for the usual adjustment of the altitude of the landside of the plow.

As before remarked, the greatest advantage of my invention will be experienced in cross-plowing corn-rows, where the elevation of one of the wheels, E or F, will be neutralized by the corresponding depression of the other, in which event the altitude of the spindle C will remain unchanged; but even in ordinary ground, where the intervals between the obstacles is not uniform, the raising or lowering of either of said wheels separately will affect the altitude of the spindle C only one-half of what the latter would be affected were the carrying-wheel journaled on said spindle, as heretofore.

My invention is as applicable to a straight axle or spindle as to a crank one.

What I claim as my invention, and desire to secure by Letters Patent of the United States, is—

1. In a wheel-plow, the combination of the axle B, extended laterally from said plow and suitably attached to said plow, and the frame D, supported at each end by carrying-wheels E and F and attached at some point between said wheels to the outer end of said axle, substantially as shown, and for the purpose specified.

2. In a wheel-plow, the combination of the axle B, the frame D, attached intermediately to said axle, wheels E and F, seated, respectively, on the ends of said frame, and suitable means to prevent the inversion of said frame, substantially as shown, and for the purpose described.

3. In a wheel-plow, the combination of the frame A, axle B, restraining-bar L, seated intermediately of said axle and attached at its inner end to said frame, arm N, stirrup M, the spring P, and frame D, substantially as shown, and for the purpose specified.

In testimony whereof I affix my signature in presence of two witnesses.

HENRY WILLIAM WILDMAN.

Witnesses:
SYLVESTER G. WILDMAN,
JOHN G. MANAHAN.